Jan. 8, 1924.
E. W. DAVIS
1,479,983
LUBRICATING SYSTEM
Filed Feb. 14, 1921
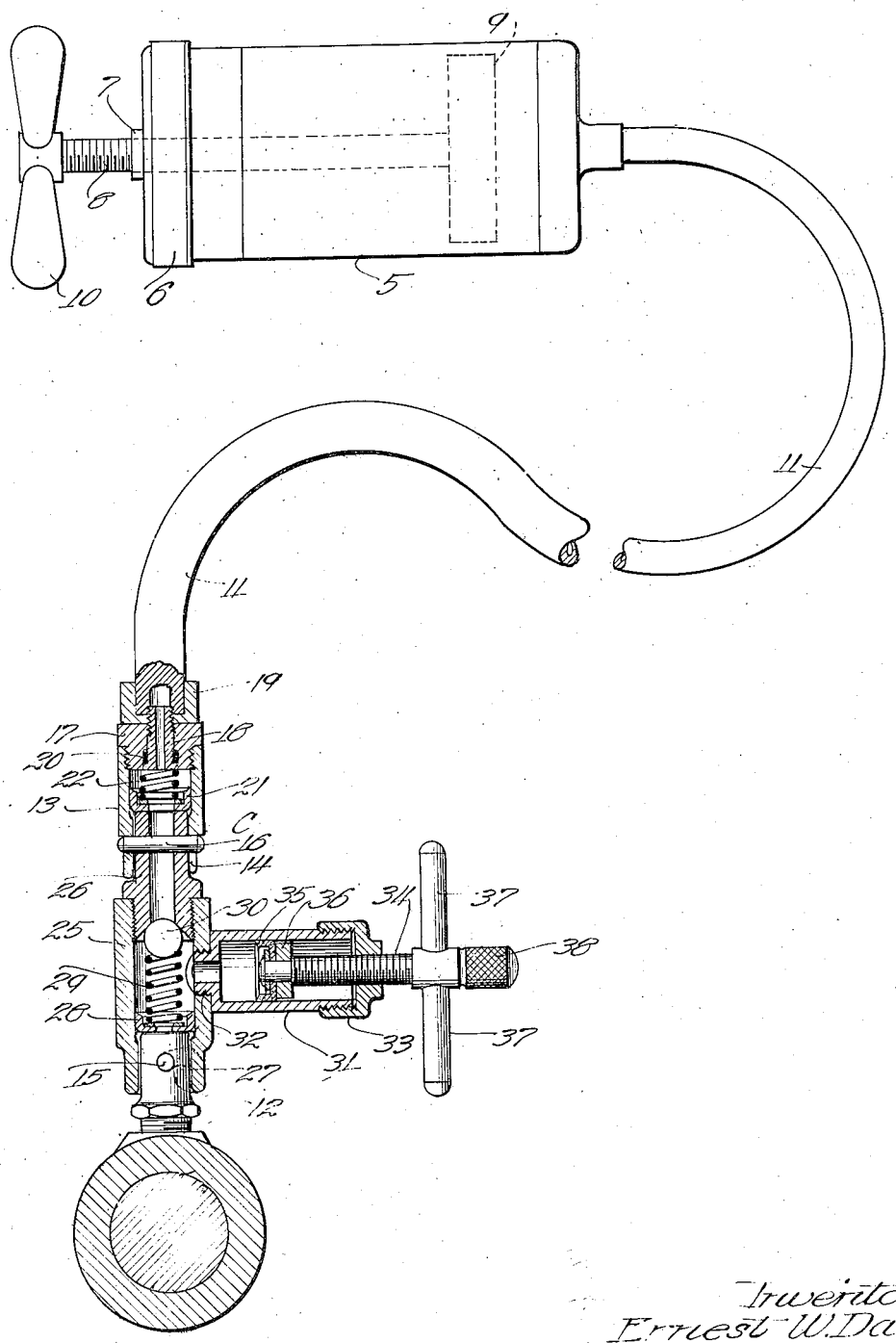
Inventor:
Ernest W. Davis
William Bradbury
See & McCaleb, Attys Patented Jan. 8, 1924.

1,479,983

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed February 14, 1921. Serial No. 444,933.

*To all whom it may concern:*

Be it known that I, ERNEST W. DAVIS, a citizen of the United States, and resident of Oak Park, in the county of Cook and State of Illinois, have invented a certain new and useful Improvement in Lubricating Systems, of which the following is a full, clear, concise, and exact description, reference being had to the accompanying drawings, forming a part of this specification.

My invention relates to improvements in lubricating systems, and is particularly concerned with improvements in lubricating systems designed to supply lubricant to a bearing under high pressure.

There are lubricating systems at present in use which comprise a plurality of nipples or coupling members, which are secured to the bearings to be lubricated, and a lubricant compressor having a flexible discharge conduit, the free end of which is provided with a coupling member adapted to be successively attached to and detached from the nipples. The compressor comprises a piston by means of which the lubricant therein can be placed under pressure, and forced into the bearings. In such systems where the lubricant compressor has sufficient capacity to hold any considerable amount of lubricant, the total pressure, which must be exerted upon the lubricant in order to subject the lubricant in the bearing to a pressure of from three or four hundred pounds to eight or nine hundred pounds per square inch, is quite considerable, and requires the application of such a large torque to the handle of the screw-threaded piston rod that it is more or less difficult for some people to obtain the desired pressure, and where, as for instance in a garage, one person is required to lubricate a plurality of cars, it becomes tiresome.

It will, of course, be understood that it does not require a pressure of three hundred pounds or more to force the lubricant into every bearing, but occasionally a bearing is found which requires the use of lubricant under exceedingly high pressure.

The objects of my invention are:

First: To provide a lubricating system comprising a plurality of nipples, a compressor for supplying lubricant thereto, and means whereby the lubricant supplied to the nipple or bearing can be placed under exceedingly high pressure with comparatively no effort on the part of the operator.

Second: To provide a system of the character described, comprising means auxiliary to the main compressor for increasing the pressure on the lubricant supplied to the bearings.

Third: To provide a system of the character described, in which the lubricant in the discharge conduit and the compressor itself is not subjected to excessive pressures.

Fourth: To provide an auxiliary pump or compressor which can be quickly attached to or detached from the main compressor, and by means of which the pressure on the lubricant can be easily increased as desired.

Fifth: To provide a system of the character described comprising an auxiliary compressor which can be quickly attached to and detached from the coupling of the flexible conduit of the main compressor and which comprises means for making successive detachable connections with the nipples which are to receive the lubricant.

Other objects of my invention will appear as this description progresses, reference being had to the accompanying drawings in which the figure is a view partially in elevation, and partially in section, showing the details of construction of my improved lubricating system, one portion of the drawing being shown on a larger scale than the other.

The compressor of my improved lubricating system comprises a cylindrical barrel 5 having a removable cap 6 at one end, which is removed for the purpose of filling the barrel. A screw threaded nut 7 extends through the cap 6, and engages the threads of the screw threaded piston rod 8, the inner end of which is provided with a suitable plunger 9, and the outer end of which has a handle 10 by means of which it can be rotated.

A flexible metallic or other suitable conduit 11 is connected with the end of the barrel opposite the cap 6, and at its free end is provided with a swivel coupling member C, which is adapted to be attached to and detached from the nipples 12, which are secured to the bearings to be lubricated. While my invention is not limited to any particular form of coupling member or nipple, the coupling illustrated herein comprises a sleeve 13, the free end of which has a pair of oppositely disposed bayonet slots 14 formed therein for receiving the pins 15 forming a part of the nipples, and for similarly receiving the ends of the pins 16, to which reference will be made later on. The sleeve 13 is screw threaded upon a plug 17, which is rotatably mounted upon a tubular member 18. The inner end of the tubular member 18 is threaded into and extends through the bottom of the cup 19, in which the free end of the metallic conduit 11 is soldered or otherwise secured. A gasket 20 interposed between the tubular member 18 and the plug 17 seals the joint between these two members.

A cup shaped leather gasket 21 is slidably mounted in the bore of the sleeve 13, and is yieldingly held in its outermost position by the compression spring 22.

The auxiliary compressor forming a part of my improved lubricating system comprises a sleeve 25 to one end of which is secured a nipple 26, having the pin 16 extending outwardly from both sides thereof, and by means of which it can be detachably secured to the sleeve 13 of the coupling C. The opposite end of the sleeve 25 is provided with bayonet slots 27, by means of which the auxiliary compressor can be attached to and detached from the nipples 12, the slots 27 co-acting with the ends of the pin 15 in a well-known manner. A cup leather 28 similar to cup leather 21 is slidably mounted in the bore of the sleeve 25, and is yieldingly held in its outermost position by a compression spring 29. A ball check valve 30 seats against the inner end of the nipple 26, and is yieldingly held in place by the end of the spring 29 opposite the cup leather 28.

The pressure element of my auxiliary compressor comprises the barrel 31, one end of which is provided with a threaded discharge conduit 32 which screws into or is otherwise secured in a suitable opening formed in the side of the sleeve 25, so as to establish communication between the barrel 31 and the sleeve 25. The opposite end of the barrel 31 is provided with a cap 33, preferably detachably secured thereto, in which is threaded a piston rod 34, carrying at its inner end a plunger comprising the cup leather 35 and the follower 36, both of which are preferably swiveled upon the inner end of the rod 34. The outer end of the rod 34 is provided with suitable handle members 37, and a knurled extension 38.

Ordinarily, in lubricating a car or other piece of machinery, the coupling C will be attached directly to the nipple 12, and the lubricant can be forced into the bearing under comparatively low pressure. When, however, a bearing is encountered which requires excessive pressure on the lubricant to discharge the used lubricant therefrom, and replace it with fresh, the nipple 26 of my auxiliary compressor is coupled to the coupling C, and the open end of the sleeve 25 is attached to the nipple which is to receive the lubricant. The main compressor is then actuated to fill the sleeve 25 and the barrel 31 with lubricant, the plunger in the barrel 31 having previously been moved to its extreme outer position. The operator thereupon moves the plunger 35 inwardly by rotating the handle 37 in the proper direction. Owing to the comparatively small diameter of the plunger in the barrel 31, an exceedingly high pressure can be developed with slight exertion, and it is a comparatively easy matter to break loose the old and caked lubricant of the bearing. The check valve 30 prevents the pressure developed in the sleeve 25 from being communicated to the lubricant in the conduit 11, and the main compressor, which is very desirable, as it permits these two elements of my lubricating system to be constructed for comparatively low pressures.

After my auxiliary compressor has been used for supplying lubricant to a bearing, it can be detached from a main compressor and the plunger in the barrel 31 can be easily and quickly returned to its outer position by merely grasping the knurled handle 38, and twirling it. Under these conditions, the handle members 37 will act as a fly wheel, and cause the plunger to return to its initial position.

While I have described the details of construction of my improved lubricating system, it is to be clearly understood that my invention is not limited to these details, but is capable of other adaptations and modifications within the scope of the appended claims, and it is to be particularly understood that while I have illustrated the auxiliary compressor forming a part of my system in connection with a lubricating system of conventional construction, my invention is not to be limited to the use of an auxiliary compressor with the particular lubricating system disclosed herein.

Having thus described my invention, what I claim is:

1. The combination with a lubricant compressor having a discharge conduit provided at its free end with a coupling member for making a detachable connection with a lubricant receiving nipple, of means for increasing the pressure on the lubricant delivered to the nipple, comprising a sleeve having means at one end for making a detachable connection with said coupling member, and means at the other end for making a detachable connection with the nipple, a high pressure pump communicating with said sleeve, and a check valve in said sleeve for preventing reverse flow of lubricant through said conduit.

2. The combination with a lubricant compressor having a discharge conduit provided at its free end with a coupling member for making a detachable connection with a lubricant receiving nipple, of means for increasing the pressure on the lubricant delivered to the nipple, comprising a sleeve having means at one end for making a detachable connection with said coupling member, and means at the other end for making a detachable connection with the nipple, and a high pressure pump communicating with said sleeve.

In witness whereof, I hereunto subscribe my name this 27th day of January, 1921.

ERNEST W. DAVIS.

Witnesses:
 EDNA V. GUSTAFSON,
 E. BOURGEOIS.